United States Patent

Arseneault et al.

[15] 3,661,309

[45] May 9, 1972

[54] LOADING AND UNLOADING AN ENDLESS WEB IN A CARTRIDGE

[72] Inventors: Paul J. Arseneault, Longmont; Louis B. Feierabend, Boulder, both of Colo.

[73] Assignee: International Business Machines Corporation, Armonk, N.Y.

[22] Filed: June 30, 1970

[21] Appl. No.: 51,091

[52] U.S. Cl. ..................226/97

[51] Int. Cl. ..................B65h 17/32

[58] Field of Search ..................226/7, 97, 95, 118, 119; 274/4 R; 179/100.2 X; 352/78, 127; 242/197, 182; 302/2; 206/51

[56] References Cited

UNITED STATES PATENTS

| | | | |
|---|---|---|---|
| 3,165,594 | 1/1965 | Wootten | 226/97 X |
| 3,185,400 | 5/1965 | Maxey | 226/118 X |
| 2,995,313 | 8/1961 | Namenyi-Katz | 242/55.16 |
| 3,386,772 | 6/1968 | Platter et al. | 226/97 X |

FOREIGN PATENTS OR APPLICATIONS

| | | | |
|---|---|---|---|
| 71,628 | 1/1960 | France | 226/97 |
| 67,481 | 10/1957 | France | 226/97 |

*Primary Examiner*—Allen N. Knowles
*Attorney*—Hanifin and Jancin and Homer L. Knearl

[57] ABSTRACT

Two cartridges are shown herein which have the capability of storing a folded endless loop of tape. The cartridges are designed so that by pneumatic pressure the loop of tape may be unloaded from the cartridge by a controlled unfolding and reloaded into the cartridge by a controlled folding. Two cartridges are shown, one containing a porous wall to permit the appropriate air flow to control the folding and unfolding, and the other containing air passages in non-porous walls to control the folding and unfolding.

8 Claims, 5 Drawing Figures

INVENTORS

PAUL J. ARSENEAULT
LOUIS B. FEIERABEND

BY Homer L. Kneavl

ATTORNEY

LOADING AND UNLOADING AN ENDLESS WEB IN A CARTRIDGE

CROSS-REFERENCE TO RELATED APPLICATION

Application Ser. No. 51,109, entitled "Loading and Unloading an Endless Web in a Cartridge," by P. J. Arseneault et al, filed June 30, 1970 and assigned to the same assignee as the present application, claims a separate invention which was a direct outgrowth of the basic invention claimed in this application.

BACKGROUND OF THE INVENTION

1. Field of the Invention

This invention relates to the storage of endless tape loops in cartridges. More particularly, the invention relates to loading and unloading a tape loop in a cartridge by folding and unfolding the loop with pneumatic pressure. The purpose is to unload and load the tape loop into a pneumatic chamber. The pneumatic chamber could either be a read station or a communication chamber to another cartridge or a read station.

2. Description of the Prior Art

Storage of endless loops in cartridges is well known. These cartridges typically contain a folded tape which always remains in the cartridge. The edge of the cartridge usually has openings where a small portion of the tape can be engaged by a capstan and a magnetic read/write head. Thus, as the tape moves, it moves past these openings and does not leave the cartridge as a whole. These cartridges are not, therefore, concerned with completely loading and unloading a tape loop from the cartridge; neither are they concerned with the inherent problem of how to fold and unfold the tape loop as it is loaded and unloaded.

Another type of endless tape loop storage is shown in U.S. Pat. No. 2,995,313 having a reel with an eccentric post which always holds the end of the tape loop. Thus, to store the tape loop, the reel with the post is rotated and the loop is wrapped around the hub and the post of the reel.

A United Kingdom Pat. No. 1,037,815 (Aug. 3, 1966) teaches an endless tape loop stored in a column wherein the tape loop is almost entirely loaded and unloaded from the column when it goes to a pneumatic chamber for read/write operations. However, the storage column contains a post on the inside of the tape loop. Thus, when the tape loop is pneumatically loaded from the storage column to the reading chamber, the loop is restrained at the mouth of the cartridge by this post. The post has pneumatic conduits to provide an air bearing between the tape and the post as the tape is driven. This United Kingdom patent also does not fold the tape on itself as it is loaded and unloaded from the storage column. The storage column contains a partition about which the tape loop will fold once.

The shortcoming of the prior art tape loop storage cartridges and tape loop storage reels is that they all contain restraints which never allow the tape loop to completely leave the cartridge. Because the tape loops are always retrained by the container in the prior art, the read/write station for the tape loop must be positioned immediately adjacent the container. Tape loops so restrained by their container cannot be interchanged between containers. Also, all of the cartridges in the prior art are relatively large in size and do not lend themself to a library data processing system containing many cartridges which can be moved automatically.

It is an object of this invention to load and unload a cartridge with an endless tape loop without restraining the tape loop in any way to the cartridge.

It is another object of this invention to compact the size of storage container required for an endless tape loop by folding the tape loop on itself as it is loaded into the cartridge.

SUMMARY OF THE INVENTION

In accordance with this invention, the above objects have been accomplished by a cartridge containing a pneumatic path for initially drawing one end of an endless web, such as a tape loop, into the cartridge, and another pneumatic path for evacuating the inside of the tape loop to fold the tape loop upon itself, and to draw the end of the loop into the cartridge. When the tape is being unloaded, the mouth of the cartridge is evacuated to draw the tape out of the cartridge. At the same time, a back pressure is provided by pneumatic passages in the cartridge to hold the folds of the loop against the walls of the cartridge until they are unfolded and drawn out by the vacuum at at the mouth of the cartridge.

In addition, the end edges of the cartridge mouth are matched to the end edges of the pneumatic chamber mouth. Thus, as the tape is moving into-and-out-of, from-and-to, the cartridge, the edges of the tape loop will not catch on the edge of the chamber or the edge of the cartridge. In addition, the throat of the chamber can be constricted as it arrives at the cartridge in order to draw the tail end of the loop into the cartridge more vigorously. This will insure that the loop is completely loaded into the cartridge.

The great advantage of our invention is that the tape loop can be moved entirely free of the cartridge in which it rides during storage. Thus, the tape loop can be moved over some distance through pneumatic chambers to a number of work stations or to another cartridge. Yet another advantage of our invention is that by having the tape loop fold upon itself, the size of the cartridge is reduced and inherently will ultimately reduce the size of a data processing library using the cartridges. Yet, another advantage of our invention is its low cost of construction in that there are a minimum number of moving parts in the loading and unloading of the tape loop.

The foregoing and other objects, features and advantages of the invention will be apparent from the following more particular description of preferred embodiments of the invention as illustrated in the accompanying drawings.

DESCRIPTION OF THE PREFERRED EMBODIMENTS

Figure 1:
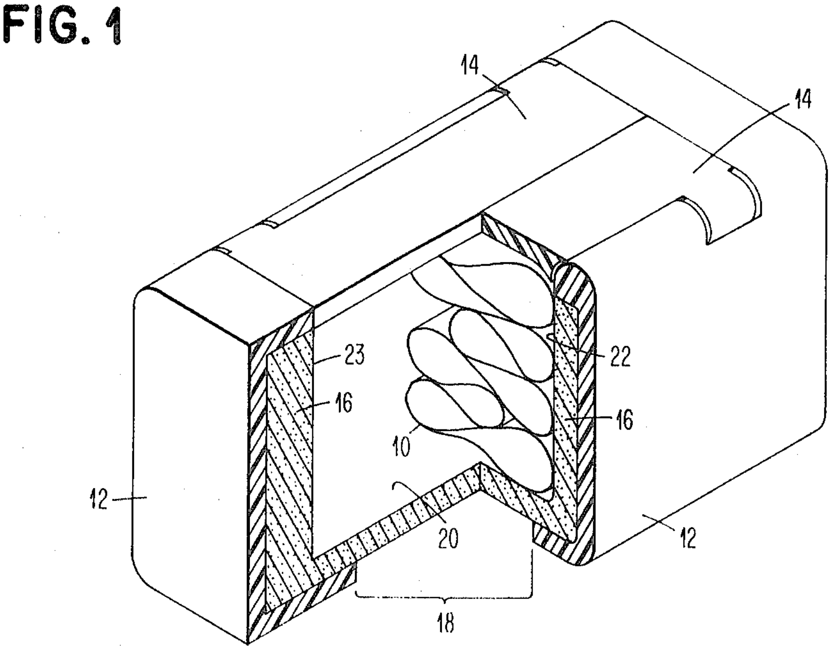
FIG. 1 shows one preferred embodiment of the invention wherein the pneumatic passages in the cartridge are accomplished by use of porous materials in the walls.

In FIG. 1 a cut-a-way of the cartridge made of porous wall material is shown. Inside the cartridge is a cut-a-way section of an endless tape loop 10 in the stored position.

The cartridge is made up of a non-porous outer wall 12, double doors 14, and an inner porous wall 16. When the cartridge is at a loading and unloading station, the double doors 14 are swung open. Doors are hinged and spring-loaded to normally remain closed. Opening can be accomplished either by pneumatic or mechanical means.

Pneumatic pressure inside the cartridge to control the loading and unloading of the endless loop 10 is accomplished by a vacuum being applied through opening 18 in the outer cartridge wall 12. The inner porous wall 16 pneumatically connects all inner walls of the cartridge to the opening 18.

To unload the tape loop 10 after the doors are opened, a vacuum would be applied at the mouth of the cartridge to draw the first fold of the tape loop out of the cartridge. To keep the entire tape loop from being pulled out as a glob, a back pneumatic pressure is applied through opening 18. This vacuum at opening 18 tends to hold the innermost fold of the tape loop against the back wall 20 of the cartridge. In addition, the vacuum is carried through the porous walls 16 and tends to hold the folds touching the side 22 of the porous wall 16. Back pressure is much less than the vacuum at the mouth of the cartridge so that the end walls of the cartridge tend to supply air. The air supplied is evacuated through the mouth of the cartridge and thus draws the tape loop out. Thus, with back pressure applied at opening 18 and a vacuum applied at the mouth of the cartridge, the tape loop 10 will be unfolded as it is drawn out of the mouth of the cartridge.

To reload the tape loop 10 back into the cartridge, the vacuum is applied at hole 18 at the bottom of the cartridge, and the pnuematic pressure in the chamber, which the tape loop is coming from, is released. The vacuum at 18 draws the leading edge of the loop into the bottom of the cartridge. With the leading edge of the loop against the bottom of the cartridge, the flow of air is through the porous wall 16 at each end 23 of the cartridge. Flow of air through this porous wall evacuates air from the inside of the tape loop. This causes the tape loop to fold upon itself in the cartridge. As the tape loop is being collapsed, the vacuum being drawn through the end walls 23 of the cartridge will also draw the tape loop into the cartridge. With the tail of the tape loop inside the cartridge, the doors 14 are released and enclose the stored loop. The vacuum at hole 18 is then released and the cartridge may be manually or automatically removed from the load/unload station.

Figure 2:
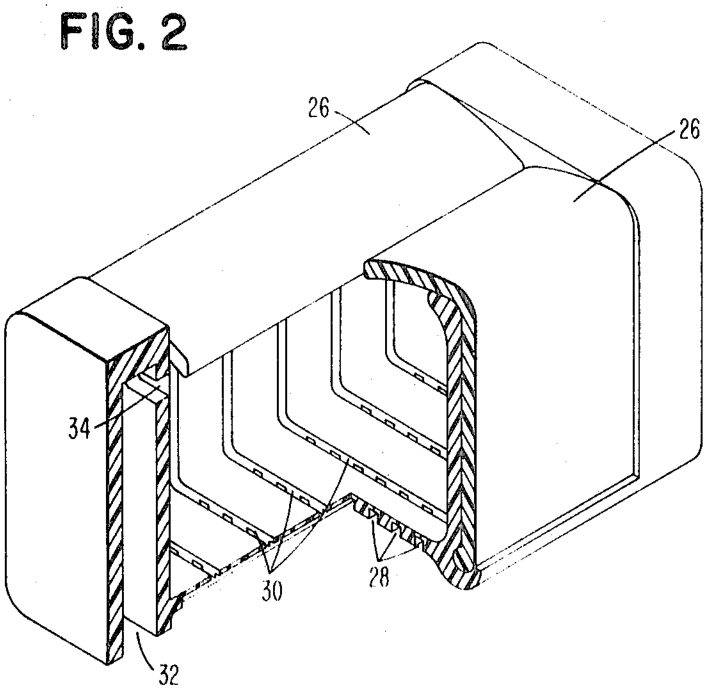
FIG. 2 shows another preferred embodiment of the invention where the cartridge has non-porous walls with pneumatic passages in the walls.

Another embodiment of the invention is shown in FIG. 2 in which no porous walls are used, but instead pneumatic passages are provided in a nonporous wall cartridge. In the cartridge of FIG. 2, the doors are hinged at the bottom of the cartridge. These doors are again spring-loaded in a closed position by springs mounted in by walls of the cartridge. The doors can be opened by pneumatic pressure. A tape loop is not shown in FIG. 2, but would, in fact, be stored in the same manner as shown for the cartridge in FIG. 1.

To unload the cartridge in FIG. 2, doors 26 are opened and a vacuum is applied at the mouth of the cartridge. To control the unfolding of the stored tape loop another vacuum is applied at the back or bottom of the cartridge and acts through longitudinal ports 28 and transverse channels 30 to hold the innermost fold of the tape loop to the bottom of the cartridge and to hold the other folds to the sides of the cartridge. Thus, the vacuum at the mouth of the cartridge will draw air supplied through ports 34 and pull the tape loop out fold-by-fold rather than as a single glob of tape.

To reload the tape back into the cartridge, a vacuum is again applied to the bottom of the cartridge and acts through ports 28 and channels 30 to draw the leading edge of the loop into the cartridge. A second vacuum is applied at each end of the cartridge through passageways 32 and ports 34 (only one shown in FIG. 2). The vacuum through ports 34 acts to evacuate air out of the center of the tape loop as it enters the cartridge and to draw the loop into the cartridge. Eventually, the entire tape loop will be folded upon itself and stored inside the cartridge. At this point the doors 26 may be released and will be spring-loaded shut to hold the loop in a stored position in the cartridge. With the loop stored, vacuums at the bottom of the cartridge through ports 28 and at the ends of the cartridge through passages 32 are released. The cartridge may then be automatically or manually removed from the tape loading and unloading station.

Figure 3:
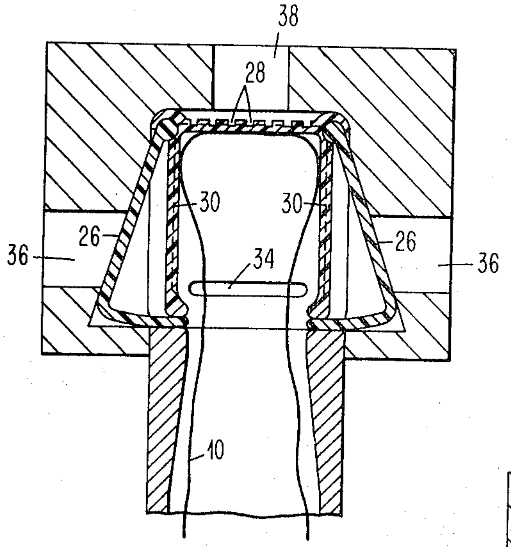
FIG. 3 shows a section of the cartridge in FIG. 2 as it begins to load an endless tape loop from an adjoining pneumatic chamber.

In FIG. 3, the end of the tape loop is shown abutting against the back of the cartridge of FIG. 2 as it is just beginning to reload into the cartridge. FIG. 3 is a sectional view as seen from the end of the cartridge. Doors 26 are held open by a vacuum through ports 36. The vacuum to draw the tape loop into the cartridge and to hold the leading edge of the loop against the back of the cartridge is applied through port 38. The flow air to port 38 is via channels 30 and ports 28 in the cartridge walls.

The vacuum to draw air out of the center of the loop is being applied through port 34. Port 34 does the main job of folding the tape loop after the leading edge of the tape loop abutts against the back of the cartridge. The effect of port 34 is to evacuate the center of the tape loop and in general to draw the tape loop into the cartridge as the tape loop folds upon itself. After the entire loop has been folded into the cartridge, the vacuum at ports 36 is released and doors 26 close so that the cartridge may be manually or automatically removed from the load/unload station.

Figure 4:
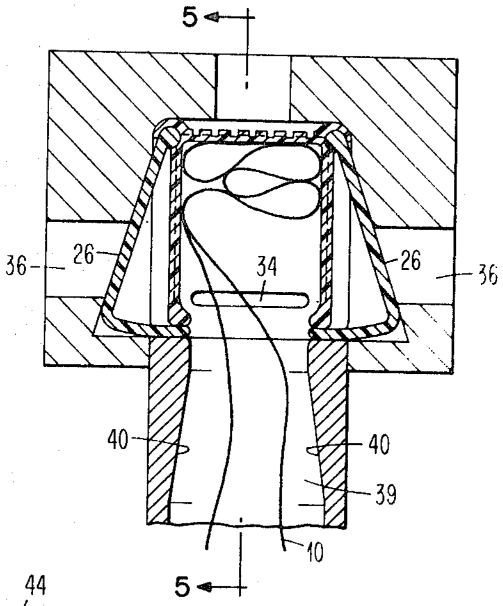
FIG. 4 shows an end view of the cartridge in FIG. 3 with the endless tape loop being loaded into the cartridge and about one-half of the loop already stored in the cartridge.

In FIG. 4, the same view of the cartridge is shown as in FIG. 3, except that the tape loop is now about one-half loaded into the cartridge. As the tape moves into the cartridge, the loop collapses on itself due to the vacuum in port 34 drawing the air out of the loop and then folds on itself randomly inside the cartridge.

To aid the drawing of the tape into the cartridge, the pneumatic chamber 39, through which the tape loop moves, has a slight constriction. Ramps 40 at the end of the pneumatic chamber act to constrict the size of the chamber. This increases the velocity of air moving from the chamber into the cartridge when the tape loop is being reloaded into the cartridge. The increased velocity of the air, in turn, aids the final drawing-in of the tail end of the tape loop before the cartridge doors are closed.

Also shown in FIG. 4 is the fact that the vacuum port 34 on each end of the cartridge acts not only to evacuate the center of the loop, but to evacuate air from around the loop as it moves into the cartridge. This also aids the folding of the loop upon itself and ultimately is responsible for drawing in the trailing edge of the loop. In effect, air flow from the pneumatic chamber 39 into port 34 will push the trailing edge of the tape loop up past the ports 34 and allow room for doors 26 to close.

Figure 5:
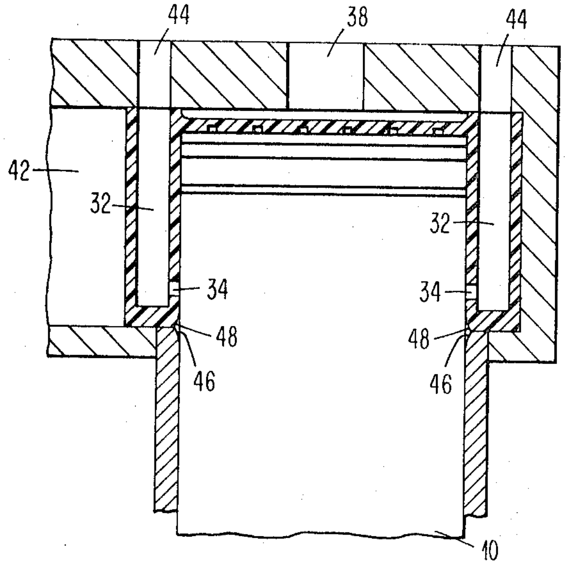
FIG. 5 is a sectional view of FIG. 4 with a tape loop being loaded into the cartridge.

In FIG. 5, a sectional view through the side of the cartridge and the load/unload station is shown. Passage 42 is provided so that the cartridge itself may be manually or automatically moved into position at the load/unload station. Ports 44 are used to apply vacuum to passages 32 and ports 34 at each end of the cartridge. Port 38 applies a vacuum to the back of the cartridge as previously described in FIG. 3. As shown in FIG. 5, the tape loop 10 is about one-half loaded into the cartridge. Thus, there is a vacuum being applied through port 38 and port 44. The vacuum through port 38 acts largely to hold the end of the tape or leading edge of the tape loop against the back of the cartridge. The vacuum through ports 44 acts through ports 34 in the cartridge to evacuate the loop and also to draw the loop in upon itself until it is entirely loaded into the cartridge.

An additional design feature shown in FIG. 5 is the rounding or beveling of the end walls of the pneumatic chamber 39 at points 46. Also, shown is the beveling of the inside end walls of the cartridge at points 48. This beveling prevents the edge of the tape from catching on either the mouth of the cartridge or the mouth of the pneumatic chamber 39 as the tape loop moves in and out of the cartridge. If this beveling is not provided, there is a risk that the tape loop will be caught on one of these edges and tend to flop over as it moves between the cartridge and the pneumatic chamber.

While the invention has been particularly shown and described with reference to preferred embodiments thereof, it will be understood by those skilled in the art that various changes in form and details may be made therein without departing from the spirit and scope of the invention. Various materials may be used to form the walls of the cartridge with plastic materials being particularly attractive because of their low cost and ease of manufacture. The cartridge is shown approximately at actual size in the drawings. Dimensions and size of the cartridge are not critical. The design elements common to the invention as described comprise, among other things, the provision of some passage to draw the leading edge of the tape loop in and an additional pneumatic passage to cause the tape to fold upon itself after it enters the cartridge.

What is claimed is:

1. Apparatus for loading and unloading an endless web in a cartridge so that when stored in the cartridge the loop formed by the endless web is folded and when not in the cartridge the loop is entirely free of the cartridge comprising:

means for opening one side of the cartridge during the loading and unloading of the loop;

means for folding the loop through the opening and into the cartridge fold-by-fold until the loop is entirely stored in the cartridge;

means for unfolding the loop through the opening and out of the cartridge, fold-by-fold, so that the loop is smoothly withdrawn from the cartridge.

2. Apparatus of claim 1 wherein said folding means comprises:

means for drawing the leading edge of the loop to the back of the cartridge;

means for evacuating air within the loop formed by the endless web so that the loop is collapsed and said evacuating means also drawing the loop into the cartridge so that as the loop collapses the loop folds upon itself in the cartridge.

3. Apparatus of claim 1 wherein said unfolding means comprises:

means for drawing the leading edge of the loop out the opening of the cartridge;

means for holding the innermost fold of the loop against the back of the cartridge until the web is unfolded and drawn-out the opening of the cartridge by said drawing means.

4. Apparatus of claim 3 wherein said unfolding means comprises in addition:

second means for holding the folds of the loop against the walls of the cartridge so that as the loop is drawn out by said drawing means the loop unfolds from the cartridge.

5. A cartridge for storing a folded tape loop and capable of pneumatically loading and unloading the loop between the cartridge and a pneumatic chamber, said cartridge having:

end walls and side walls for containing the folded tape loop, one of said side walls movable to open the cartridge so that the tape loop can be loaded into or unloaded out of the cartridge;

a first plurality of pneumatic passages in said walls arranged for pneumatically loading the tape loop in folds from the chamber into the cartridge;

a second plurality of pneumatic passages in said walls arranged for pneumatically unloading the tape loop in folds from the cartridge into the chamber.

6. The cartridge of claim 5 wherein said first plurality of passages have:

a passage arranged for drawing the first fold of the tape loop into the cartridge and holding the first fold against the back wall of the cartridge;

a passage arranged for evacuating the air from inside the tape loop via the end walls of the cartridge and for drawing the tape loop into the cartridge so that as the tape loop collapses the tape loop is folded upon itself in the cartridge.

7. The cartridge of claim 5 wherein said second plurality of pneumatic passages have:

a passage arranged for supplying air through the walls of the cartridge and out the mouth of the cartridge so that the outermost fold of the tape loop is drawn out the mouth of the cartridge and into the chamber;

a passage arranged for applying a back pressure to the folds of the tape in the cartridge so that the tape loop unfolds as the loop is withdrawn from the cartridge.

8. The cartridge of claim 5 wherein said walls have:

an outer, non-porous wall;

an inner porous wall, said first and second pneumatic passages being formed by the pores in said inner porous wall.

* * * * *